United States Patent [19] [11] 4,401,531
Martín San Lorenzo et al. [45] Aug. 30, 1983

[54] PROCESS FOR THE PRODUCTION OF ELECTROLYTIC ZINC OR HIGH PURITY ZINC SALTS FROM SECONDARY ZINC RAW-MATERIALS

[76] Inventors: Daniel Martin San Lorenzo, Brujula 5, Torrejón de Ardoz; José M. Regife Vega, San Ernesto 12; Eduardo D. Nogueira, Avda. del Mediterraneo 47, both of Madrid, all of Spain

[21] Appl. No.: 393,947

[22] Filed: Jun. 30, 1982

[30] Foreign Application Priority Data

Jul. 24, 1981 [ES] Spain ................................. 504.250

[51] Int. Cl.³ .............................................. C25C 1/16
[52] U.S. Cl. .............................. 204/114; 75/101 BE; 423/106; 23/295 R; 23/296
[58] Field of Search .................. 204/114; 75/101 BE; 423/99, 100, 101, 106; 23/295 R, 296

[56] References Cited

U.S. PATENT DOCUMENTS 3,853,981 12/1974 Hadzeriga ................. 75/101 BE
3,989,607 11/1976 Bush et al. ........................ 423/100
4,288,304 9/1981 De Marthe et al. ................. 423/100

Primary Examiner—R. L. Andrews

[57] ABSTRACT

The present invention relates to a process for the production of either electrolytic zinc or high purity zinc salts from secondary zinc raw materials which comprises: leaching said raw material in a slightly acid aqueous solution at controlled pH, separating the reaction mixture into a leaching liquor containing the leached zinc and a solid residue which after suitable washing is descarted; directing the zinc-bearing liquor to a solvent extraction facility where it is brought into contact with an organic solution containing organic acids as cationic extraction reagents, by means of which, an ion exchange of zinc by hydrogen ions is achieved, resulting in a zinc loaded organic solution and in an aqueous solution containing the stoichiometric acidity to the extracted zinc; recycling the acid aqueous raffinate to the previous leaching step where it is used as the slightly acid aqueous solution to carry-out the zinc leaching from the raw material; sending the zinc organic extract to a stripping facility where it is brought into contact with a strong acid solution of zinc sulphate, by means of which an ion exchange of zinc by hydrogen ions takes place, thus producing a concentrated solution of zinc sulphate and an organic solution free of zinc, containing the stoichiometric acidity to the stripped zinc, which is recycled back to the previous step to perform the zinc extraction; directing the concentrated zinc sulphate aqueous solution either to an electrowinning facility to produce electrolytic zinc, or to a crystallization plant for the production of pure zinc sulphate; recycling back to the previous step of zinc stripping either the spent electrolyte from the electrowinning facility or the mother liquors from the crystallization plant to form, after suitable sulphuric acid make-up, the strong acid solution of zinc sulphate, by means of which zinc stripping from the organic extract is achieved.

16 Claims, 1 Drawing Figure

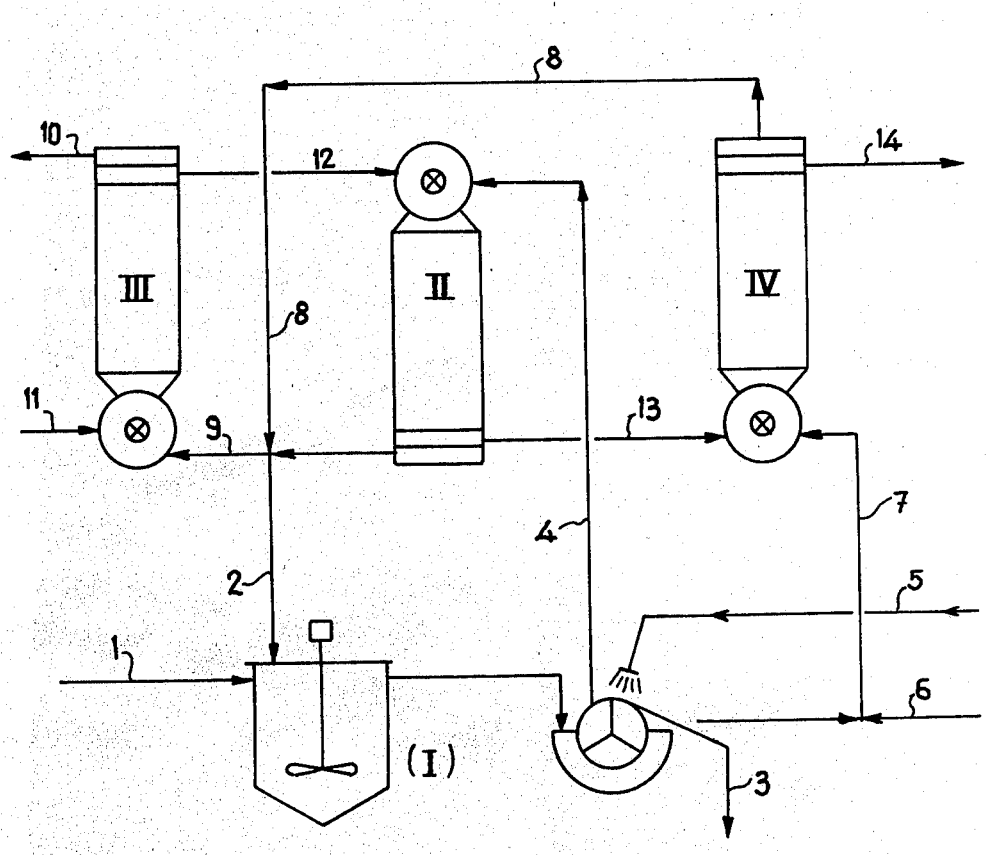

PROCESS FOR THE PRODUCTION OF ELECTROLYTIC ZINC OR HIGH PURITY ZINC SALTS FROM SECONDARY ZINC RAW-MATERIALS

The present patent invention application relates to the hydrometallurgical treatment of differing secondary sources of zinc, zinc alkaline solids or impure solutions in sulphate or chloride medium, to which a basic technology is applied to obtain electrolytic zinc or high purity zinc compounds.

There are numerous secondary sources of zinc for which processing by traditional methods require treatments which are not always satisfactory from the technical or economic viewpoint owing to the precise fact that they are not main sources of zinc.

Such secondary sources may be solids or liquids. Solids such as smelting slags, galvanising ashes, alkaline zinc drosses, impure zinc oxides or hydroxides, etc. Liquid solutions containing zinc in chloride or sulphate medium such as impure zinc electrolytes, leaching effluents, etc. In the case of liquid solutions, precipitation with lime or whatsoever alkali suffices to obtain a workable cake for the application of the process object of the present invention. The novelty of the process consists in combining two complementary effects to achieve the required end: extraction of zinc by means of organic acids serving as extraction agents (cationic extractants), and exploitation of the acidity obtained by this extraction, outlined in the reaction (1), in the leaching of the zinc solid or alkaline slurry feed.

The organic reagent used in extraction may be alkyl phosphoric— or alkyl phosphonic—acids of a molecular weight in excess of 200 and diluted in kerosene or the like in a concentration of less than 30% by volume; preferably di-2-ethyl hexyl phosphoric (D2EHPA) acid 20±5% in kerosene.

The two steps of extraction and leaching complement each other in their acid-basic effects at the same time as the zinc extraction occurs in the organic phase with the consequent refining triggered by the selectivity of the phase in relation to the zinc.

In the first step, the extraction governed by the reaction

wherein RH represents the extraction reagent and the underlined species are in the organic phase, the acidity used in the second stage of the process: the leaching in aqueous medium of the raw material feed, is produced.

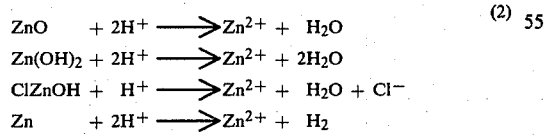

The acidity created in the extraction step is equal to the zinc extracted, which, in turn, is a function of the zinc which is leached during the second step. As a result once the initial reaction is triggered the cycle is repeated without further restriction other than the accumulation of impurities in the aqueous circuit. This restriction is avoided by a minimal discharge of the aqueous volume of the circuit, always remaining below 25% of the aqueous flow-rate and normally located around the 10% level. The water discharge of the extraction-leaching circuit is contacted with the whole of the organic phase flow at a different extraction stage, known as the reclaining stage, where a more extensive extraction of the zinc in the discharge is achieved so that the losses of zinc will be minimized.

The organic extract obtained after the extraction also contains a number of impurities in small quantities, the contamination being a function of the leached impurities which in turn depend upon the nature of the raw material used. These impurities must be removed if a very high purity product needs to be produced. This additional refining is achieved during an organic scrubbing stage with a small flow of acid solution, which may contain zinc in solution and with which an organic solution practically free from co-extracted or entrained ions is obtained. After completing its function the scrub liquor may be used to make-up for the flow and the equivalent lost ions in the discharge of the extraction—leaching water.

The washed organic extract is stripped with an acid solution according to the reaction in equation (3),

whereby the organic phase becomes free to restant the cycle, and depending on the flow and the type of stripping solution used, the required zinc products can be obtained with a high degree of purity: zinc electrolyte, zinc sulphate, etc. These solutions allow subsequent transformation into electrolytic zinc by electrolysis, or into crystallized (heptahydrate or monohydrate) zinc sulphate.

A simplified sketch of the basic technology for which a patent is requested, is outlined in FIG. 1 of the accompanying sheet of drawings, in which the following steps and streams may be identified:

Step I—Raw material leaching and filtration
Step II—Solvent extraction
Step III—Reclaining
Step IV—Organic extract scrubbing
Stream 1—Raw material feed
Stream 2—Aqueous solution to leaching
Stream 3—Leached solid (solid waste)
Stream 4—Extraction aqueous feed
Stream 5—Washing water
Stream 6—Sulphuric acid for acidifying stream 7
Stream 7—Liquor for organic extract scrubbing
Stream 8—Liquor from scrubbing
Stream 9—Aqueous feed to reclaining stage
Stream 10—Aqueous raffinate (liquid effluent)
Stream 11—Unloaded organic solution to reclaining stage
Stream 12—Organic to extraction section
Stream 13—Organic extract to scrubbing
Stream 14—Clean organic extract to stripping Each of the steps, grouped into the two basic circuits of the process is described below: Leaching (step I) and solvent extraction (steps II, III and IV).

The raw material (stream 1) is fed to leaching (step I) at a particular size smaller than 12 mesh Tyler, with a preferred total zinc content between 65±25% for solids and 20±10% for filtration slurries, and with a metallic zinc content of less than 50%. This raw material is supplied in a controlled form to maintain a pH of 2.5±0.5 after vigorous stirring with the leaching aqueous solution (stream 2) for a period of 30±15 minutes and at a temperature below 70° C. During leaching the extraction acidity which is achieved is neutralised according to the reaction (1), normally held within the range of 13±5 g/l of sulphuric acid.

The slurry obtained after leaching is filtered to obtain a liquid (stream 4) which is essentially a solution of zinc sulphate with a pH of 2.5±0.5, and is forwarded to the solvent extraction step and a solid (stream 3), which after washing forms the solid product of the process, and of which the properties, weight reduction, composition, etc. obviously depend upon the raw material used. The washing water from washing the leached solid may be incorporated either to the extraction-leaching aqueous solution or to the organic extract scrubbing step.

The aqueous solution produced by leaching (stream 4) is forwarded to extraction (step II), where in 3 stages countercurrently with the organic phase (stream 12) the transfer of the $Zn^{2+}$ from the aqueous—to the organic—solution takes place according to reaction (1). Each extraction stage consists of a mixer in which both phases are intimately combined to facilitate the material transfer, and a settler where the two phases are separated.

The organic extract or zinc-loaded organic solution (stream 13) moves on to step IV to remove co-extracted or entrained impurities by washing in two or three stages with an aqueous solution (stream 7) which is acidified with sulphuric acid (stream 6), thus obtaining an organic extract practically free from impurities (stream 14) and a washing liquid (stream 8) which is incorporated to the leaching section.

The aqueous phase from extraction (stage II) is forwarded to leach the solid feed (stream 2), diverting a small fraction (stream 9) forming the discharge of the leached impurities and sent to the reclaiming stage (step III) so as to minimise the zinc losses by contacting it with the whole of the unloaded organic flow (stream 11) at a single stage to obtain an queous raffinate (stream 10) and an organic extract (stream 12) which is incorporated to the extraction section (step II).

The organic extract obtained after the whole of the four stages (stream 14) contains the extracted zinc in practically pure form and can be stripped according to reaction (3), the reverse of reaction (1), $$R_2Zn + 2H^+ \rightarrow Zn^{2+} + 2RH \quad (3)$$

with any acid solution, thus obtaining an unloaded organic phase allowing the cycle to be resumed once more, and an acid aqueous solution containing the extracted zinc under conditions of extreme purity.

When the required product is a zinc electrolyte, the remainder of the process (stripping and electrolysis) may be coupled with the cationic cycle and electrolysis—stages outlined in Spanish Pat. No. 405.759.

A number of non-resctrictive examples of the basic stages of the present invention are outlined below, in which a number of different variables are considered such as: type of raw material, leaching time, temperature, pH, type of organic extractants, etc. Experimental results obtained in each case are also analysed in each example shown.

EXAMPLE 1

This example considers the leaching yields for different raw materials, the properties of which appear in Table 1.

The leaching conditions were as follows:

| | |
|---|---|
| leaching aqeous solution acidity (g/l $H_2SO_4$) | 17.2 |
| stirring time (min.) | 30 |
| temperature (°C.) | 45 |
| final neutralisation pH | 2.7 |
| total equivalents in leached aqueous solution (equiv/l) | 0.42 |

The results obtained are recapitulated in Table II and it may be noted that in each case the zinc solubility yield is in excess of 97%.

TABLE 1

| | | MATERIAL | | |
|---|---|---|---|---|
| | | 1 | 2 | 3 |
| Identification | | Precipitation slurries | Alkaline zinc solids | Galvanising ashes |
| Zn (total) | % | 20 | 48.1 | 72 |
| Zn (metallic) | % | — | — | 30 |
| Pb | % | — | 7.30 | 1.80 |
| Cu | % | 0.1 | 3.25 | 0.02 |
| Fe | % | 1.0 | 1.15 | 0.45 |
| Ca | % | 17 | 1.40 | 0.20 |
| $Cl^-$ | % | — | 3.54 | 4.0 |
| $SO_4^=$ | % | 37 | 8.68 | 0.20 |
| Insolubles | % | — | 4.10 | 1.85 |

TABLE 2

| RAW MATERIAL TYPE | 1 | 2 | 3 |
|---|---|---|---|
| Leaching zinc yield % | 99.1 | 97.6 | 99.0 |
| Analysis of leaching residue % | | | |
| Zn | 0.31 | 4.9 | 7.2 |
| Pb | — | 30.4 | 15.1 |
| Cu | 0.01 | 9.0 | 2.8 |
| Fe | 0.19 | 4.4 | 3.7 |
| Ca | 26.4 | 3.34 | — |
| Cl | — | — | 0.39 |
| Leaching residue to raw material ratio | 0.57 | 0.24 | 0.1 |

EXAMPLE 2

The present example demonstrates the influence of stirring time and final neutralization pH upon the leaching yield.

The following conditions are common throughout the test:

| | |
|---|---|
| Temperature (°C.) | 40 |
| Leaching stages | 3 |
| Total equivalents in aqueous solution (equiv/l) | 0.41 |
| Raw material: | |
| galvanising dross with following properties (%): | |
| Zn (total) | 63 |
| Zn (metallic) | 3 |
| Pb | 1.4 |
| Cu | 0.2 |
| Fe | 1.4 |
| Ca | 1.6 |
| $Cl^-$ | 1.8 |
| $SO_4^=$ | 0.7 |
| Insolubles | 4 |

Results obtained in relation to the zinc leaching yield were as follows:

| leaching time | (min) | 34 | 34 | 50 |
|---|---|---|---|---|
| final leaching | pH | 2.7 | 2.1 | 2.7 |
| zinc leaching | (%) | 96.0 | 98.7 | 97.7 |

A favourable effect is obtained by increasing reaction time and decreasing final pH, the latter being particularly more significative.

EXAMPLE 3

This example compares the zinc extraction performance of two organic acid reagents:

Di-2-ethyl-hexyl-phosophoric acid (D2EHPA)

$$\begin{array}{c} R-O \\ \phantom{R-O} \diagdown \\ \phantom{R-O} P \\ \phantom{R-O} \diagup \diagdown \\ R-O \phantom{AA} OH \end{array} \begin{array}{c} O \\ \diagup\diagup \\ \phantom{O} \\ \phantom{OH} \end{array}$$

Di-2-ethyl-hexyl-phosphonic acid (HEH/EHP/)

$$\begin{array}{c} R-O \\ \phantom{R-O} \diagdown \\ \phantom{R-O} P \\ \phantom{R-O} \diagup \diagdown \\ R \phantom{AAA} OH \end{array} \begin{array}{c} O \\ \diagup\diagup \\ \phantom{O} \\ \phantom{OH} \end{array}$$

In both cases the extraction agent concentration as well as the dilution medium were the same.

Common extraction conditions:

| organic reagent concentration in kerosene | 20% by volume |
|---|---|
| temperature | ambient (~20° C.) |
| composition of aqueous feed | |
| to extraction: (medium SO₄⁼) Zn (g/l) | 18.8 |
| pH | 3.5 |
| organic to aqueous phase ratio (see FIG. 1): | |
| Stage II | 4:1 |
| Stage III | 20:1 |

The results are summarized in Table 3. The two organic reagents are acceptable for the process, though a certain advantage is recorded for the D2EHPA in this example with reference to zinc extraction yield and capacity, consequently generating a greater acidity in the aqueous medium which is reflected in an increased leaching yield for the raw material.

TABLE 3

| | Concentration (g/l) | | | | | |
|---|---|---|---|---|---|---|
| | Organic extract | Leaching aqueous medium | | Aqueous raffinate | | Extraction |
| Extraction reagent | Zn | Zn | H₂SO₄ | Zn | H₂SO₄ | yield (%) |
| D2EHPA | 3.5 | 5.3 | 18.1 | 2.0 | 24.3 | 97.8 |
| HEH [EHP] | 2.7 | 8.3 | 13.4 | 5.3 | 20.1 | 94.3 |

EXAMPLE 4

This example considers the technology in an overall manner, also using a stripping system producing two high purity products: zinc electrolyte and a zinc sulphate solution. The experiment is carried out continuously in a pilot plant, confirming previous results and emphasizing the absence of co-extraction of impurities in the organic extract and its removal in the aqueous raffinate.

In order to aid identification of the different streams, the diagram appearing in FIG. 1 is used.

| Common conditions: | |
|---|---|
| temperature (°C.) | 35 |
| number of leaching stages (step I) | 5 |
| extraction stages (step II) | 3 |
| reclaiming stages (step III) | 1 |
| washing stages (step IV) | 3 |
| residence time: | |
| in each extraction mixer (min) | 3 |
| leaching (in the 5 stages) (min) | 30 |
| final leaching pH | 2 |
| organic reagent: type | D2EHPA |
| concentration by vol. (%) | 19.2 |
| diluent | Kerosene |

Results are summarized in Table 4, columns E and S respectively representing the two products obtained i.e. zinc electrolyte and zinc sulphate. It is deduced from the table that
- the organic extract is barely contaminated and the products are of a very high purity,
- the total zinc recovery yield is in excess of 98%.
- effluent volumes are greatly reduced and easily treated for the purposes of waste disposal.

It may be summarized that in all cases under consideration the overall zinc recovery level is distinctly high (96-98%), the co-extraction of impurities being negligible and the final products being of high quality for a low reagent consumption.

TABLE 4

| | STREAM No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | E | S |
| CON- | | | | | | | | | FLOW-RATE | | | | | | | |
| CENTRATIONS | 6,45 | 530 | 1,08 | 530 | 60 | 3 | 63 | 63 | 60 | 60 | 776 | 776 | 776 | 776 | 97,5 | 13,8 |
| Zn | 62 | 2 | 5,5 | 10 | — | 143 | 6,8 | 5,8 | 1,31 | 0,32 | 0,10 | 0,21 | 5,5 | 5,6 | 80 | 143 |
| H₂SO₄ | — | 9 | — | — | 1,5 | 32 | 3,0 | 2,6 | 6,3 | 9,8 | — | — | — | — | 125 | 32 |
| Pb | 1,35 | 0,006 | 7,2 | 0,008 | — | 0,002 | — | <0,005 | <0,005 | <0,005 | — | — | — | — | 0,002 | 0,002 |
| Ca | 1,65 | 0,68 | 6,1 | 0,70 | — | 0,08 | — | 0,067 | 0,025 | 0,3 | — | — | 0,015 | 0,0013 | <0,001 | 0,08 |
| Fe | 1,32 | 0,53 | 4,9 | 0,61 | — | 0,010 | — | 0,003 | 0,002 | 0,28 | 0,65 | — | 0,65 | 0,65 | 0,018 | 0,010 |
| SO₄⁼ | 0,63 | 12 | 18 | 13 | — | — | — | — | — | 10,2 | — | — | — | — | — | — |
| Cl⁻ | 1,14 | 3,4 | 0,06 | 3,7 | — | 0,017 | — | 0,32 | 0,17 | 2,4 | — | — | 0,02 | 0,003 | 0,016 | 0,017 |
| Cu | 0,153 | 0,006 | 1,03 | 0,006 | — | 0,001 | — | 0,001 | <0,001 | 0,005 | — | — | — | — | <0,001 | 0,001 |
| Cd | 0,06 | 0,08 | 0,04 | 0,09 | — | 0,001 | — | 0,005 | 0,002 | 0,05 | — | — | — | — | <0,001 | 0,001 |
| Ni | 0,048 | 0,056 | 0,16 | 0,07 | — | <0,001 | — | 0,003 | 0,002 | 0,04 | — | — | — | — | <0,001 | <0,001 |
| Co | 0,002 | <0,001 | 0,002 | 0,001 | — | — | — | — | — | — | — | — | — | — | — | — |
| As | 0,023 | 0,008 | 0,007 | 0,009 | — | 0,0001 | — | 0,0006 | 0,0003 | 0,005 | — | — | — | — | 0,0001 | 0,0001 |

TABLE 4-continued

| | STREAM No. | | | | | | | | | | | | | | | |
|---|---|---|---|---|---|---|---|---|---|---|---|---|---|---|---|---|
| CON-CENTRATIONS | 1 | 2 | 3 | 4 | 5 | 6 | 7 | 8 | 9 FLOW-RATE | 10 | 11 | 12 | 13 | 14 | E | S |
| | 6,45 | 530 | 1,08 | 530 | 60 | 3 | 63 | 63 | 60 | 60 | 776 | 776 | 776 | 776 | 97,5 | 13,8 |
| pH | — | 0,75 | — | 2 | — | — | — | — | — | 0,9 | — | — | — | — | — | — |

UNITS:
Flow-rate: solids in g/min; Liquids in mL/min.
Concentrations: solids as %; Liquids in g/L;

What is claimed is:

1. A process for the production of either electrolytic zinc or high purity zinc salts from secondary zinc raw materials which comprises: leaching said raw material in a slightly acid aqueous solution at controlled pH, separating the reaction mixture into a leaching liquor containing the leached zinc and a solid residue which after suitable washing is discarded; directing the zinc-bearing liquor to a solvent extraction facility where it is brought into contact with an organic solution containing organic acids as cationic extraction reagents, by means of which, an ion exchange of zinc by hydrogen ions is achieved, resulting in a zinc loaded organic solution and in an aqueous solution containing the stoichiometric acidity to the extracted zinc; recycling the acid aqueous raffinate to the previous leaching step where it is used as the slightly acid aqueous solution to carry-out the zinc leaching from the raw material; sending the zinc organic extract to a stripping facility where it is brought into contact with a strong acid solution of zinc sulphate, by means of which an ion exchange of zinc by hydrogen ions takes place, thus producing a concentrated solution of zinc sulphate and an organic solution free of zinc, which is recycled back to the previous step to perform the zinc extraction; directing the concentrated zinc sulphate aqueous solution either to an elctrowinning facility to produce electrolytic zinc, or to a crystallisation plant for the production of pure zinc sulphate; recycling back to the previous step of zinc stripping either the spent electrolyte from the electrowinning facility or the mother liquors from the crystallisation plant to form, after suitable sulphuric acid make-up, the strong acid solution of zinc sulphate, by means of which zinc stripping from the organic extract is achieved.

2. A process according to claim 1 wherein the secondary zinc raw material comprises a solid material containing between 15% and 90% of zinc where most of it is in an oxidized form with a maximum metallic zinc content of 50%, and a particle size smaller than 1.68 mm.

3. A process according to claim 2 wherein the secondary zinc raw material is obtained from an aqueous zinc bearing solution by precipitation with an alkali.

4. A process according to claim 1, wherein the slightly acid aqueous solution used to carry-out the raw material leaching must contain $H_2SO_4$ at a concentration of $13\pm5$ g/l.

5. A process according to claim 1, wherein the leaching operation is performed under vigorous stirring conditions for a period of time equivalent to a residence time of $30\pm15$ minutes.

6. A process according to claim 1 wherein the zinc raw material leaching operation is carried-out at a temperature of $45°\pm5°$ C.

7. A process according to claim 1 wherein the addition of the zinc raw material to the leaching liquor must be performed by controlled dosing in such a way that the final pH of the resulting leaching aqueous solution must be $3\pm1$.

8. A process according to claim 1 wherein the total anion concentration in the leaching liquor must be $0.6\pm0.2$ equivalents per liter.

9. A process according to claim 1 wherein the organic acid used in the zinc extraction as cationic reagent is one of the series of alkyl phosphoric or alkyl phosphonic acids with a molecular weight in excess of 200.

10. A process according to claim 1 wherein the organic solution used for zinc extraction consists in the organic acid diluted in a mixture of hydrocarbons such as kerosene, at a concentration of $20\pm5\%$ by volume.

11. A process according to claim 1 wherein the aqueous solution containing the leached zinc and the organic solution containing the organic acid are countercurrently contacted in several stages using conventional solvent extraction equipment in such a way as to obtain an extraction efficiency higher than 60% of the initial zinc content of the aqueous solution.

12. A process according to claim 1 wherein a fraction of the aqueous raffinate from the zinc extraction, still containing less than 40% of the initial zinc content, is diverted from the system as a bleed-off stream to control the impurities build-up, in the aqueous solution circuit, the said fraction, depending on the soluble impurities level in the raw material, must be set at a value below 25% of the total raffinate.

13. A process according to claim 1 wherein the aqueous solution bleed-off is sent to a solvent extraction stage where it is contacted with the total volume of the unloaded organic solution coming from zinc stripping, in order to achieve the maximum zinc extraction from this bleed-off stream before discharging it and thus improving the overall yield of the process.

14. A process according to claim 1 wherein the organic extract containing the extracted zinc is sent to a scrubbing section where it is countercurrently contacted in several stages with an acid aqueous solution at an organic to aqueous phase ratio of $40\pm10$ to 1, thus obtaining a clean organic extract, which is sent to the stripping section, and an impure aqueous liquor, which is sent to the leaching section, where it is used as part of the water and acid make-up required by the raffinate bleed-off.

15. A process according to claim 1 wherein the organic extract is countercurrently contacted in several stages with a strongly acid zinc sulphate solution using conventional solvent extraction equipment, in such a way as to obtain more than 95% of zinc stripping from the organic solution, thus producing a concentrated zinc sulphate aqueous solution and an unloaded organic solution which is recycled back to the extraction section.

16. A process according to claim 1 wherein zinc stripping from the organic extract may be carried-out using another mineral acid different from sulphuric acid, such as hydrocoloric acid, nitric acid, phosphoric acid, sulphurous acid, etc. to produce aqueous solutions of the corresponding zinc salts, from which pure zinc salts are produced.

* * * * *